Dec. 17, 1968             J. D. HARRIS             3,417,326
TEST UNIT FOR CHECKING ELECTRIC CIRCUITRY OF A PUMPING MACHINE
Filed June 22, 1966                         3 Sheets-Sheet 1

INVENTOR
JOHN D. HARRIS
BY

Dec. 17, 1968　　　　　J. D. HARRIS　　　　　3,417,326

TEST UNIT FOR CHECKING ELECTRIC CIRCUITRY OF A PUMPING MACHINE

Filed June 22, 1966　　　　　　　　　　　　　　3 Sheets-Sheet 2

INVENTOR
JOHN D. HARRIS

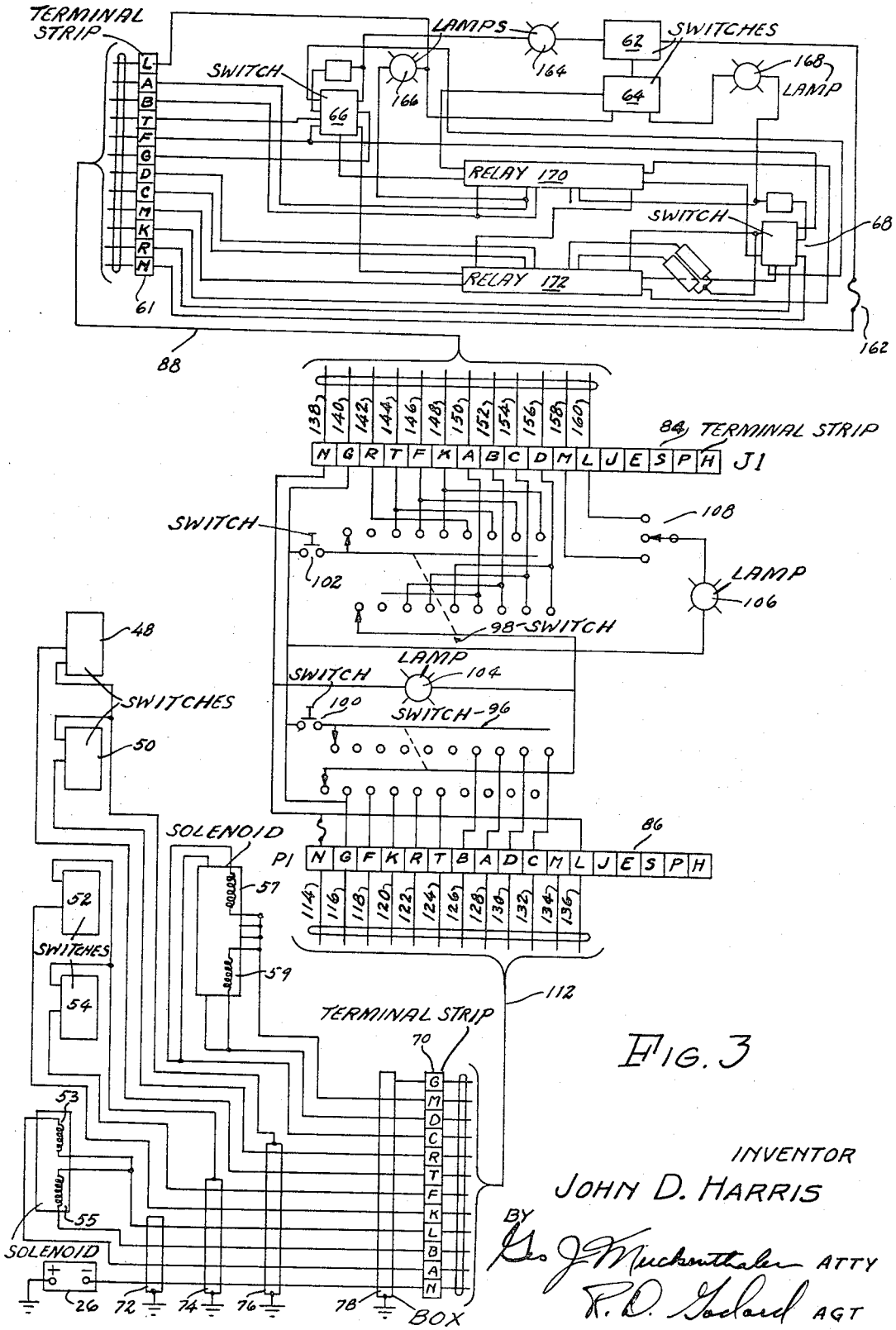

United States Patent Office 3,417,326
Patented Dec. 17, 1968

3,417,326
TEST UNIT FOR CHECKING ELECTRIC CIR-
CUITRY OF A PUMPING MACHINE
John D. Harris, Union Grove, Wis., assignor to J. I. Case
Company, Racine, Wis., a corporation of Wisconsin
Filed June 22, 1966, Ser. No. 559,455
3 Claims. (Cl. 324—51)

ABSTRACT OF THE DISCLOSURE

An electric test unit for a pumping machine which has electric circuits in a control panel and which has electrically operative means. The control panel and the electrically operative means are electrically connected by releasable connection means, and the test unit is likewise electrically connected to the control panel and to the electrically operative means. Thus the arrangement is such that the test unit can be inserted in electric series between the control panel and the electrically operative means, and it can also be readily removed from its inserted position when the test is completed. Selective electric switches and test lamps are employed for making electric connection and for indicating completion of circuits in the respective control panel and in the respective electrically operative means.

This invention relates to testing devices and particularly to a test unit for checking electrical circuitry in a machine used for pumping discrete particle material. While the particular test unit will be shown and described as connected for checking circuits on a concrete placer, it could be used and adapted for checking electrical circuits on a sand pump, a slurry pump, or other machines of this nature. However, it will be understood that the testing procedure would also be varied for these other machines.

A machine for pumping discrete particle material, unlike one for pumping fluids, is susceptible to plugging under various conditions due to the nature of the material. The fluid pump carrying confluent material need not be checked and watched so carefully as many of the fluids are in themselves lubricants within the pumping system. The discrete particle pumping machine must be checked and serviced more frequently to prevent lodging of material, or blocking or plugging of the pumping mechanism and its lines. The best operator of a machine, whether it be a simple pump or a complicated engine, will usually make a check to see if the component parts and the entire unit are in proper working order before starting the operation. The simple pump may require only a check to see if the connections are all made and tight, the impeller is free and power is available and connected. A complicated engine, such as an aircraft engine, usually requires a check-off procedure to determine if all systems are functioning properly. In the case of a concrete pump, due to the nature of the material, the hydraulic and electrical circuits to the operating parts should be tested and checked prior to starting the operation.

It is, therefore an important object of the present invention to provide a testing device for checking continuity and operation of electrical circuits in a pumping machine.

Another object of this invention is to provide an economical test unit which can be quickly connected to a pumping machine for checking the electrical circuits.

A further object of the invention is to provide a test unit which has separate test circuits for checking pump switches and valve operation on the machine body and separate test circuits for checking the machine control panel.

Another object of the invention is to provide a test unit which is used as a trouble shooter when any part of the electrical system is malfunctioning or is not working properly.

Additional objects and advantages will become apparent from a reading of the following specification and the annexed drawings, in which:

FIG. 3 is a circuit diagram showing the relative arrangement of the parts of the invention.

Figure 1:
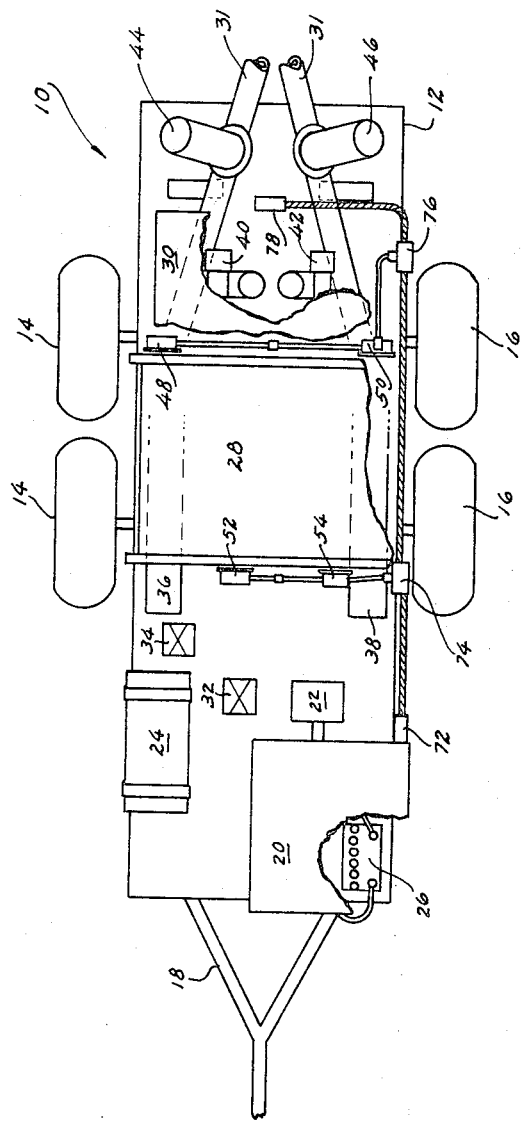
FIGURE 1 is a diagrammatic view of the component parts of a machine on which the invention is utilized.

As seen in FIG. 1, a concrete placer, generally designated as 10, basically includes a frame 12, carried on right-hand wheels 14 and left-hand wheels 16 and a tongue 18 attached to the frame for coupling to a towing vehicle (not shown). A prime mover 20 is supported on the front section of the frame and is connected to drive a hydraulic pump 22 for supplying hydraulic fluid to the material delivery units. A fuel tank 24 is provided, of course, for the prime mover and a conventional battery 26 is provided for supplying electrical energy for certain parts of the machine. The machine also includes a reel 28 and a hopper 30, the reel carrying material delivery hoses or lines 31 and the hopper being provided for a supply of material prior to being pumped into delivery lines 31 and through the hoses to the desired location.

A pair of four-way valves 32 and 34 are provided for controlling the hydraulic fluid when the pump is in operation and for operating hydraulic cylinders 36 and 38 and the control valves. These valves include solenoids for proper actuation from the control systems. The machine also includes double acting cylinders 36 and 38 which are controlled from valve 32, and a pair of inlet and outlet valves 40 and 42 and a pair of delivery or discharge valves 44 and 46 which are controlled from valve 34. The construction and operation of the pump and valve assembly is adequately described and shown in U.S. patents issued to Wilkinson et al. No 3,198,123 and No. 3,205,906 and assigned to applicants assignee. These patents show the hydraulic and electrical circuits employed for control of the cylinders and valves and they also show the various positions of the plug valves which control the timing and amount of material flow into the discharge lines 31.

Figure 4:
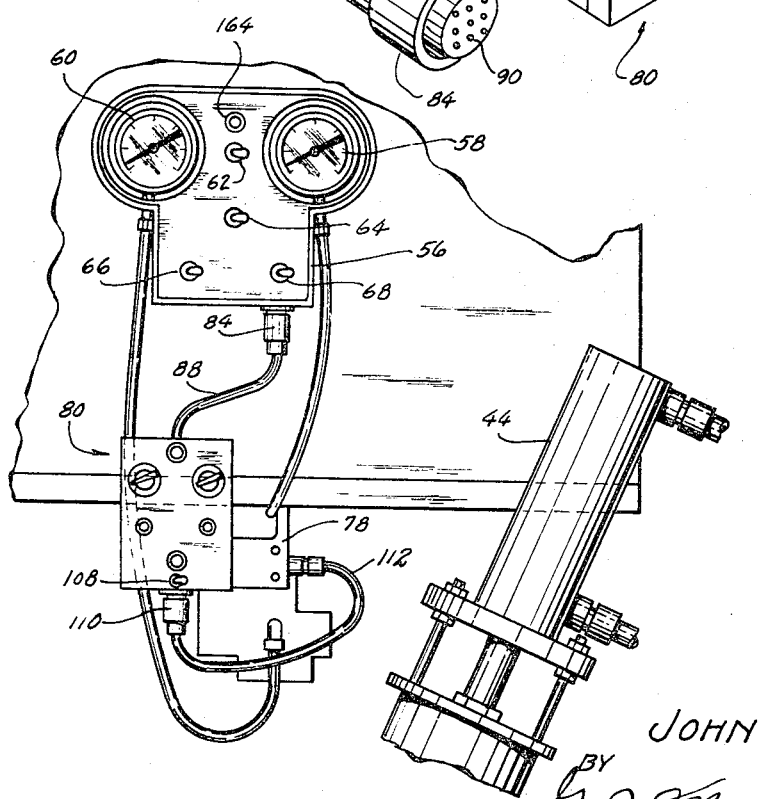
FIG. 4 is a view of the test unit in position and connected to a machine for checking the component electrical parts.

FIGS. 1 and 3 also show pressure switches 48 and 50 and limit switches 52 and 54. These limit switches are connected into the electrical circuitry for controlling the direction and travel of the hydraulic cylinders 36 and 38 and the operation of these switches is adequately described in the above-mentioned patents. Valve 32 includes a right-hand solenoid 53 (FIG. 3) and a left-hand solenoid 55 for pumping cylinder control, and valve 34 includes right-hand solenoid 57 and left-hand solenoid 59 for controlling the inlet and outlet valves and the discharge valves. A control panel 56, shown in FIG. 4, is installed and connected at the rear of the machine, and this panel includes the relays and switches for machine operation and includes a terminal strip 61, shown at the top in FIG. 3. The control panel in FIG. 4 includes pressure control gauges 58 and 60, a master toggle "on-off" switch 62, a delivery toggle "on-off" switch 64 and a pair of individual delivery toggle switches 66 and 68. Indicating lights are also included in the face of the control panel to show the position of the switches and to show which plug valves are open.

The control panel 56 includes the above-mentioned gauges, switches and lights in a compact enclosure which is attached to the machine in an easily accessible location. The electrical circuitry on the machine runs from a terminal strip 70 and connects to the limit switches 52 and 54, the pressure switches 48 and 50 and the valve solenoids 53, 55, 57, 59, as shown in FIG. 3. Junction boxes 72, 74, 76 and 78 are provided on the frame to accommodate the wiring runs.

Figure 2:
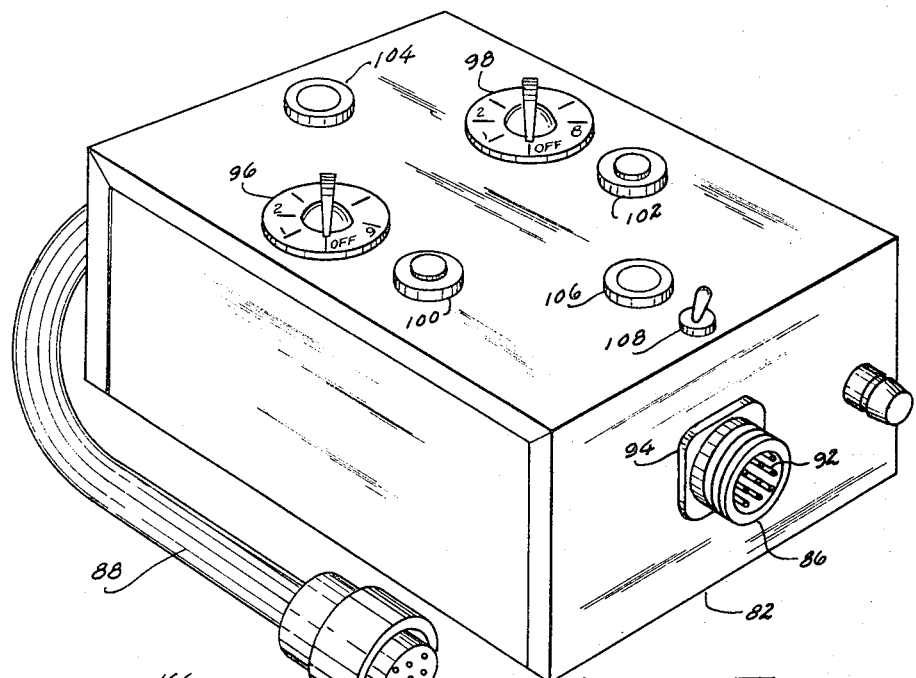
FIG. 2 is a perspective view of the invention.

Before it is desired to start operation of the machine, the operator practices the invention and connects a test unit 80, shown in FIG. 2, into the electrical circuit and makes the necessary switching and checking to make sure that the switches, valves and solenoids are working properly. The test unit includes an enclosure or container 82 housing the test equipment, the container being portable so that it can be conveniently carried from one place to another. The test unit has a first terminal assembly J1 and a second terminal assembly P1 in the wiring diagram of FIG. 3. The first terminal assembly is connected to a multiconductor raceway or sheath 88 which encloses the wiring, the wiring being connected to and running from a plurality of sockets 90 embedded in the assembly and connected to a terminal strip 84 in the enclosure. The second terminal assembly includes a plurality of pins 92 embedded in a connector 94 which is attached to one end of the test enclosure by means of screws and the pins 92 are connected to a terminal strip 86. The face of the test unit has a pair of rotary-type selector switches 96 and 98, a pair of pushbutton switches 100 and 102, indicating lights 104 and 106, and a toggle switch 108. As seen in FIG. 3, leads in the test unit are connected to the terminal strips 84 and 86, and also connected to the various switch points and to the lights.

The test unit is used to check out the pump electrical system including the pressure switches 48 and 50, the limit switches 52 and 54 and the solenoids for the pumping cylinders 36 and 38, for the inlet and outlet valves 40 and 42, and for the delivery valves 44 and 46. The limit and pressure switches are checked by using pushbutton 100 and selector switch 96 to complete a circuit through the switches on the machine and through the one ampere lamp 104. The valve solenoids are checked by applying voltage from the test unit to the valves to actuate the solenoids, by means of button 100 and switch 96. The test unit is also used to check out the circuits in control panel 56 with pushbutton 102 and selector switch 98.

When it is desired to check out the electrical system on the concrete pump, the test unit is carried to the rear of the machine, and installed as shown in FIG. 4. A cable assembly 112 is normally connected during machine operation from panel 56 to junction box 78. A cannon connector 110 on cable 112 is now removed from the lower side of the control panel 56 and is connected to terminal assembly 86 in the lower side of test unit 80. One end of cable assembly 88 is connected in the lower end of control panel 56, the wiring being connected to terminal strip 61, and the other end being permanently connected into the terminal assembly at the top of the test unit and the wiring being connected to terminal strip 84.

The multiconductor cable 112 has a lead 114 (FIG. 3) which connects to terminal N of strip 86 and to a corresponding terminal on the strip in junction box 78, a lead 116 which connects to terminal G of strip 86, a lead 118 which connects to terminal F, a lead 120 to terminal K, a lead 122 to terminal R, a lead 124 to terminal T, a lead 126 to terminal B, a lead 128 to terminal A, a lead 130 to terminal D, a lead 132 to terminal C, a lead 134 to terminal M and a lead 136 to terminal L, each of the leads connecting to a corresponding terminal on strip 70 in junction box 78. These leads are continued through junction boxes 72, 74, 76 and 78, as required, to connect to the battery 26, the pressure switches 48 and 50, the limit switches 52 and 54, and the solenoids 53, 55, 57 and 59 for the pumping cylinder control valve 32 and for the valving cylinder control valve 34. It is believed that FIG. 1 of the above-mentioned patents adequately discloses the machine wiring and since the machine wiring is not a part of the present invention, it will not be further described, except as it is related to practicing the invention. It is thus seen that where the electrical circuitry was connected on strip 61 at the control panel 56 and on strip 70 at junction box 78, by means of cable 112, when the test unit is installed, the circuits now run through the test unit. In other words, the test unit is inserted in the line between the control panel 56 and the junction box 78.

Cable 88 has a lead 138 which connects to terminal N of strip 84 and to a corresponding terminal on strip 61 in control panel 56, a lead 140 which connects to terminal G of strip 84, a lead 142 which connects to terminal R, a lead 144 to terminal T, a lead 146 to terminal F, a lead 148 to terminal K, a lead 150 to terminal A, a lead 152 to terminal B, a lead 154 to terminal C, a lead 156 to terminal D, a lead 158 to terminal M, and a lead 160 to terminal L, each of the leads connecting to a corresponding terminal in the control panel.

The procedure used in testing the machine electrical parts with the test unit 80 will now be described. The prime mover 20 is started which runs pump 22 and delivers fluid to be circulated in the hydraulic control system. The hydraulic control system is disclosed in the above-mentioned patents and need not be further described. The master switch 62 and the main delivery switch 64 are turned on which initiates cycling of the pumping cylinders 36 and 38 and the inlet valves 40 and 42 and the delivery valves 44 and 46. The unit is then stopped so that the cylinder rams are in a mid-stroke position and are not contacting the limit switches 52 and 54. The prime mover is turned off and the pressure is reduced to zero, as indicated on gauges 58 and 60, by alternately activating the manual delivery switches 66 and 68.

The test unit is installed as described above and as shown in FIG. 4, and the master switch 62 is turned on and the main delivery switch 64 is turned off. The ignition coil wire for starting the prime mover 20 is disconnected to prevent damage to the breaker points during the checkout and the ignition switch is then turned on. The first phase of the checkout with the test unit consists of checking the electrical components which are mounted on the machine or the pump chassis.

1. *Power to control panel*

The chassis control selector switch 96 is turned to position 1 on the dial which completes a circuit from the battery 26 to terminal N on strip 70, through lead 114, to terminal N on strip 86, through lamp 104 and switch 96 to terminal G on strip 86, through lead 116, to terminal G on strip 70 and to ground at junction box 78. Lamp 104 will light when this circuit is completed.

2. *Left-hand limit switch*

The chassis control selector switch 96 is turned to position 2 on the dial which connects a circuit from the battery 26 through lead 114 to terminal N on strip 86, through lamp 104 and switch 96 to terminal F on strips 86 and 70, through the limit switch 54 and to ground at junction box 74. Lamp 104 will light when this circuit is completed by manually depressing the limit switch rod. If lamp 104 lights before the limit switch rod is depressed, the trouble may be that the limit switch is stuck or the lead between the limit switch and terminal F is grounded.

3. *Right-hand limit switch*

The chassis control selector switch 96 is turned to position 3 which connects a circuit from the battery 26 through lamp 104 and switch 96 to terminal K on strips 86 and 70, through the limit switch 52 and to ground at junction box 74. Lamp 104 will light when this circuit is completed by manually depressing the limit switch rod. If lamp 104 lights before the limit switch rod is depressed, the trouble may be that the limit switch is stuck or the lead between the limit switch and terminal K is grounded.

4. Left-hand pressure switch

The selector switch 96 is turned to position 4 which connects a circuit from the battery 26 through lamp 104 and switch 96 to terminal R on strips 86 and 70, through the pressure switch 50 and to ground at junction box 76. The lamp 104 will not light until the circuit is completed which may be done by inserting a feeler gauge between the switch activator and the pressure rim. If the lamp 104 lights before activating the pressure switch, either the pressure switch is stuck, it is out of adjustment, or a short exists between terminal R and the switch.

5. Right-hand pressure switch

The selector switch 96 is turned to position 5 which connects a circuit from the battery through lamp 104 and switch 96 to terminal T on strips 86 and 70, through the pressure switch 48 and to ground at box 76. The lamp 104 will not light until the circuit is completed which may be done by inserting a feeler gauge between the switch activator and the pressure rim. If the lamp 104 lights before activating the pressure switch, either the pressure switch is stuck, it is out of adjustment, or a short exists between terminal T and the switch.

6. Pumping cylinder valve—left-hand solenoid

The selector switch 96 is turned to position 6 which connects a circuit from the battery to terminals N and L on strip 86, through the solenoid coil to terminal B on strip 86, through the switch 96 and the pushbutton 100 to terminal G and ground. This circuit is completed by depressing button 100 which energizes the solenoid rod, the rod moving out as long as button 100 is depressed. If the rod does not move out, there is either a short or break in the lead between terminal L and the solenoid coil or a short or break between the coil and terminal B.

7. Pumping cylinder valve—right-hand solenoid

The selector switch 96 is turned to position 7 which connects a circuit from the battery to terminals N and L on strip 86, through the solenoid coil to terminal A on strip 86, through the switch 96 and button 100 to terminal G and ground. This circuit is completed by depressing button 100 which energizes the solenoid rod, the rod moving out as long as button 100 is depressed. If the rod does not move out, there is either a short or break in the lead between terminal L and the solenoid coil or a short or break between the coil and terminal A.

8. Inlet and outlet valves—left-hand solenoids

The selector switch 96 is turned to position 8 which connects a circuit from the battery to terminals N and M on strip 86, through the solenoid coils to terminal D on strip 86, through the switch 96 and button 100 to terminal G and ground. This circuit is completed by depressing button 100 which energizes the solenoid rods, the rods moving out as long as button 100 is depressed. If either or both rods, do not move out, there is either a break in the leads between terminal M and the solenoid coils or a break in the leads between the coils and terminal D or loose connections in box 78.

9. Inlet and outlet valves—right-hand solenoids

The selector switch 96 is turned to position 9 which connects a circuit from the battery to terminals N and M on strip 86, through the solenoid coils to terminal C on strip 86, through switch 96 and button 100 to terminal G and ground. This circuit is completed by depressing button 100 which energizes the solenoid rods, the rods moving out as long as button 100 is depressed. If either or both rods do not move out, there is either a break in the leads between terminal M and the solenoid coils or a break in the leads between the coils and terminal C or loose connections in box 78.

The second phase of the checkout with the test unit consists of checking the electrical component circuits in the control panel. The test unit 80 is installed as shown in FIG. 4 and the cables 88 and 112 are connected as described above. The control panel 56 includes, in addition to the master control switch 62, the main delivery switch 64 and the individual delivery switches 66 and 68, a fuse 162 in the line circuit and an indicating lamp 164 which shows when switch 62 is closed so that the system may be energized. The panel also includes a pair of indicating lamps 166 and 168 to indicate the position of the delivery switches and, when energized, show which discharge valve is open so that material is then being supplied through one of the lines 31. A latching relay 170 and a reversing relay 172 are provided in the panel for controlling the solenoids for valves 32 and 34 and it is believed that the above-mentioned patents adequately describe the construction and operation of the control panel parts, so that further description is not required.

The control panel selector switch 98 is turned to position 1 which connects a circuit from terminal N on strip 84 through lead 138 to the corresponding terminal on strip 61 and through the relay contacts and switches, through lead 142 to terminal R, through switch 98 and through lamp 104. Depending upon the position of the contacts in the relay, the lamp 104 may or may not become energized. If the lamp does not come on, button 102 is depressed to complete the circuit.

The selector switch 98 is turned to position 2 which connects a circuit from terminal T on strip 84 through lead 144 to the corresponding terminal on strip 61. The lamp 104 may or may not be energized, so button 102 is depressed to complete the circuit.

Positions 3–8 are progressively selected to connect the circuits through leads 146–156. The lamp 104 will not come on until button 102 is depressed to complete these circuits.

The next check is made by turning the main delivery switch 64 on and moving the valve power switch 108 to the left check position. The circuit is completed through the control panel and lamp 106 should then come on. In like manner, when the switch 108 is moved to the right check position the circuit is completed through the control panel and lamp 106 should then come on.

The checkout of the machine switches and solenoids is performed quickly and if there is a broken wire, a shorted wire or a loose connection, the operator can isolate the trouble and make the necessary repair or replacement. If during the control panel checkout, the light does not come on as called for, it is convenient to remove the control panel and replace with another panel. The test unit is, at the least, utilized in a manner to quickly determine if there is trouble either in the machine wiring or in the control panel.

It is thus seen that herein shown and described is a portable test unit to check out the electrical circuits in a concrete pump, the unit is economical and simple to operate, and it saves countless hours of hit-and-miss trouble shooting in cases where there is a malfunction in machine operation, especially when men are waiting to proceed with work or when materials have to set and eventually be scrapped, as in the case of concrete.

Variations on the foregoing description will no doubt occur to those skilled in the art, however, it is to be understood that all such variations are contemplated as within the scope of the invention, insofar as defined in the claims.

What is new and desired to be secured by Letters Patent of the United States is:

1. In a test unit for checking electric circuitry of a pumping machine including an electric control panel having a plurality of electric circuits and a plurality of electrically operative means with each of said means being exclusively and respectively electrically connected to certain ones of said circuits by a releasable electric connector, a portable container, a first terminal assembly in said container and having a plurality of electric wires with electric connection points, a first electric switch with a plurality of electric contacts, a first electric test lamp electrically connected to said first switch, said contacts of said first switch and said electric connection points of said first terminal assembly being exclusively and respectively electrically connected together, a releasable electric connector with a plurality of electric connections exclusively and respectively electrically connected in series between said electric wires of said first terminal assembly and each of said electric circuits in said control panel for connecting said first switch and said first test lamp to said control panel, a second terminal assembly in said container and having a plurality of electric wires with electric connection points, a second electric switch with a plurality of electric contacts, a second electric test lamp electrically connected to said second switch, said contacts of said second switch and said electric connection points of said second terminal assembly being exclusively and respectively electrically connected together, and a releasable electric connector with a plurality of electric connections exclusively and respectively electrically connected in series between said electric wires of said second terminal assembly and each of said electrically operative means for connecting said second switch and said second test lamp to said electrically operative means.

2. The subject matter of claim 1, including a first additional electric switch electrically connected in series with said first electric switch and said first test lamp, and a second additional electric switch electrically connected in series with said second electric switch and said second test lamp.

3. The subject matter of claim 1, wherein said releasable electric connectors all include mateable connection means adapted to render said connectors inter-connectable for electrically inserting said test unit between said control panel and said electrically operative means just as said control panel and said electrically operative means are electrically connected together in the absence of said test unit.

References Cited

UNITED STATES PATENTS 3,103,808  9/1963  Eichelberger _____ 324—51 XR

RUDOLPH V. ROLINEC, *Primary Examiner.*

G. R. STRECKER, *Assistant Examiner.*